United States Patent [19]

Peschka

[11] 4,386,309
[45] May 31, 1983

[54] STORAGE OF LIQUID HYDROGEN

[75] Inventor: Walter Peschka, Sindelfingen, Fed. Rep. of Germany

[73] Assignee: Deutsche Forschungs- und Versuchsanstalt für Luft- und Raumfahrt e.V., Bonn, Fed. Rep. of Germany

[21] Appl. No.: 271,265

[22] Filed: Jun. 8, 1981

[30] Foreign Application Priority Data

Jun. 19, 1980 [DE] Fed. Rep. of Germany ....... 3022802

[51] Int. Cl.³ .................. E17C 3/00; F01K 15/02; F17C 13/00; H02J 7/00
[52] U.S. Cl. ......................................... 322/2 R; 62/45; 62/239; 220/901; 290/50; 320/61
[58] Field of Search ................. 322/2 R; 320/2, 3, 61; 290/43, 54, 50; 62/7, 239, 241–244, 45, 47, 54; 180/65 B; 60/DIG. 2; 220/901

[56] References Cited

U.S. PATENT DOCUMENTS

| 3,297,926 | 1/1967 | Campbell et al. | 290/50 UX |
| 3,460,706 | 8/1969 | Hoover | 220/901 X |
| 3,565,201 | 2/1971 | Petsinger | 62/7 X |
| 3,681,609 | 8/1972 | Boese | 290/50 X |
| 3,821,626 | 6/1974 | Mauer et al. | 320/3 |
| 4,288,002 | 9/1981 | Gobl | 220/901 X |

FOREIGN PATENT DOCUMENTS 52-16014  7/1977  Japan .

OTHER PUBLICATIONS

"The Complete Book of Electric Vehicles," Shacket, Pub. Domus Books, 1979, pp. 22, 23, 148.

Primary Examiner—R. J. Hickey
Attorney, Agent, or Firm—Laubscher, Philpitt & Laubscher

[57] ABSTRACT

Hydrogen evaporating in a liquid hydrogen tank is fed to a fuel cell generating electrical energy used to drive a cooling unit which cools the tank.

9 Claims, 1 Drawing Figure

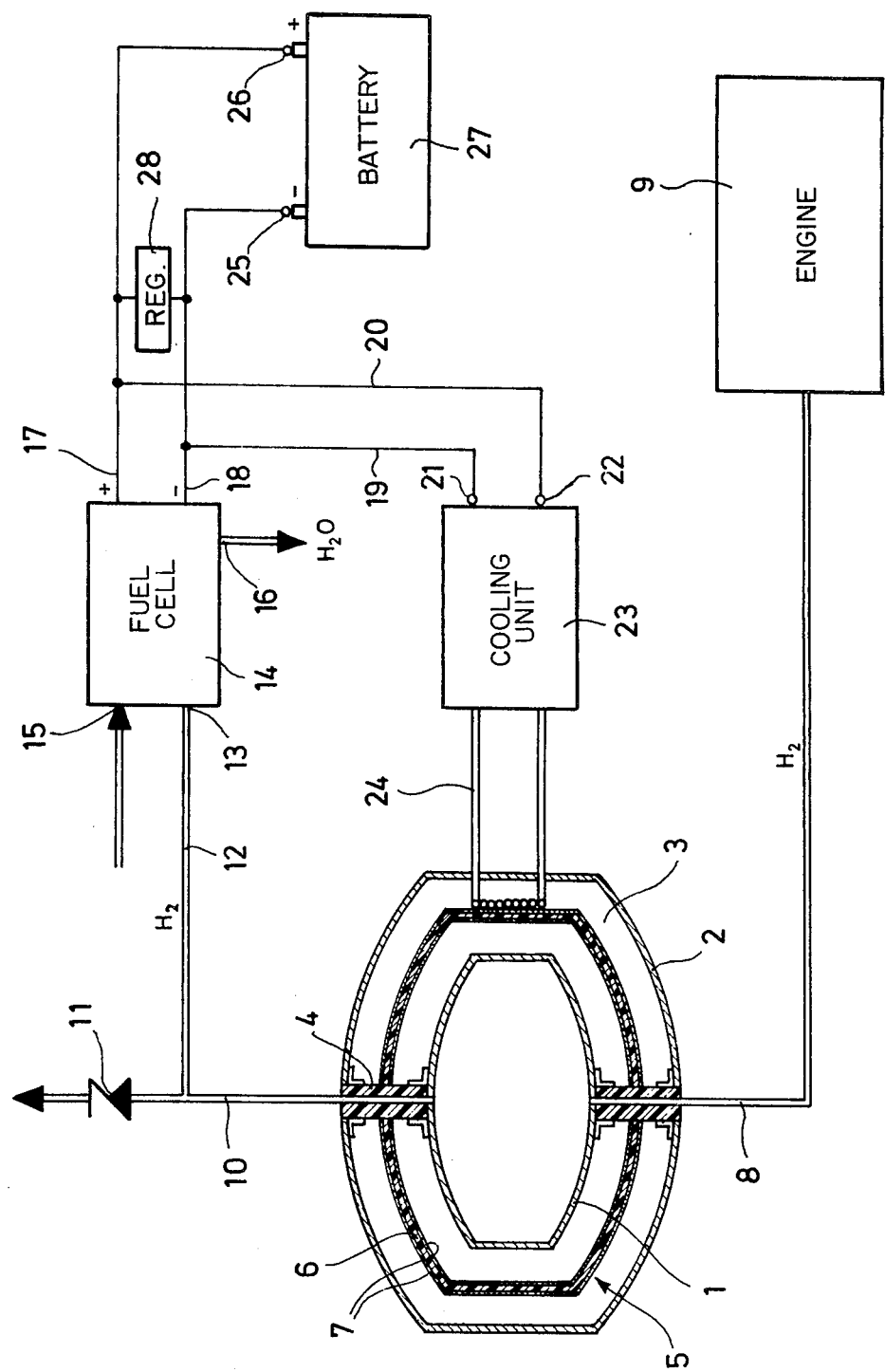

STORAGE OF LIQUID HYDROGEN

The invention relates to a method of increasing the storage time of a liquid hydrogen tank and to apparatus for performing this method.

When using liquid hydrogen kept at low temperatures as an energy source, in particular as a fuel in internal combustion engines, the problem arises that the hydrogen evaporates as a result of heat influx from the surroundings, i.e. the storage time of the liquid hydrogen in the hydrogen tank is limited, even if heat conduction is largely eliminated by surrounding the hydrogen tank with a vacuum insulation casing. Therefore, in the first place an undesired consumption of the liquid hydrogen occurs, and in the second place it is difficult to remove without danger the gaseous hydrogen which is produced. In particular the use of liquid hydrogen for driving motor vehicles can lead to difficulties when the motor vehicle is not used for a long period.

The present invention provides a method of increasing the storage time of a liquid hydrogen tank, in which hydrogen evaporating in the liquid hydrogen tank is fed to a hydrogen fuel cell and, by means of the electrical energy thus produced, drives a cooling unit which cools the liquid hydrogen tank.

Using this method, troublesome gaseous hydrogen which would otherwise have to be released into the atmosphere is used to generate electrical energy in the fuel cell. The cooling unit cools the liquid hydrogen tank directly or indirectly and substantially reduces the evaporation rate in the tank. Altogether a considerably extended storage time is thereby obtained.

In particular, it may be provided that a radiation shield surrounding the liquid hydrogen tank is cooled by means of the cooling unit.

It is also advantageous if part of the electrical energy generated in the fuel cell is supplied to the battery of a motor vehicle when the liquid hydrogen is used as fuel for the motor vehicle. In this way the battery of a motor vehicle may be recharged even during a pause in operation.

In preferred apparatus for practising the above method, an outlet line for removing evaporating hydrogen from a liquid hydrogen tank surrounded by a vacuum insulation casing, is connected to one gas intake of a hydrogen fuel cell, and the electrical contacts of the fuel cell are connected to a cooling unit cooling the liquid hydrogen tank.

It is advantageous if the liquid hydrogen tank is surrounded by a radiation shield disposed inside the vacuum insulation casing and if the cooling unit is in thermal contact with the radiation shield.

The cooling unit is preferably a thermoelectric cooling element or a linear-oscillating Stirling cooler.

The invention will be described further, by way of example, with reference to the accompanying drawing, whose sole FIGURE is a diagrammatic illustration of an arrangement for increasing the storage time of a liquid hydrogen tank in a motor vehicle.

A closed tank 1, containing liquid hydrogen and consisting for example of high-grade steel or an aluminium alloy, is surrounded at a distance by an insulation casing 2 in a vacuum-tight manner. The intermediate space 3 is substantially evacuated so that thermal conduction to the surroundings is virtually eliminated. The mounting of the tank 1 inside the insulation casing 2 is diagrammatically illustrated by central supports 4 in the drawing, but in practice mounting may be effected in any desired manner, care being taken that the mounting does not act as a thermal bridge. A radiation shield 5 surrounding the tank 1 is arranged in the intermediate space 3. The radiation shield 5 consists of a plastic shell 6 which is coated on both sides with a super-insulation layer 7. In this way thermal radiation between the tank and the surroundings is largely eliminated.

A pipeline 8, only illustrated diagrammatically in the drawing, leads from the lower part of the tank 1 to the engine 9 of the motor vehicle (or to another consumer of liquid hydrogen.) A pipeline 19 leads from the upper part of the tank 1 to the atmosphere by way of a safety valve 11. A pipeline 12, which leads to the hydrogen gas intake 13 of a fuel cell 14, branches off from the pipeline 10 upstream of the safety valve 11. The other gas intake 15 of the fuel cell is connected to a suitable oxygen source, for example to an oxygen cylinder or (as shown) to an air supply. The water produced in the fuel cell 14 is removed through an outlet 16.

The two electrical contacts 17 and 18 of the fuel cell are connected, by way of lines 19 and 20 respectively, to the terminals 21 and 22 respectively of a cooling unit 23, for example a thermocouple (Peltier element) or a linear-oscillating Stirling cooler. The cooling side of the cooling unit 23 is in thermal contact with the radiation shield 5 through the insulating casing 2, by way of a coolant pipeline 24. The electrical contacts 17 and 18 of the fuel cell 14 are additionally connected to the contacts 25 and 26 respectively of a rechargeable battery 27; a regulator 28 is associated with the battery 27 in a known manner.

The hydrogen gas evaporating inside the tank 1 is fed by way of the pipelines 10 and 12 to the intake 13 of the fuel cell 14, in which the hydrogen gas, together with the oxygen supplied by way of the intake 15, is converted to water. The electrical energy generated in this way is fed by way of the lines 19 and 20 to the cooling unit 23, which cools the radiation shield 5 and thus reduces the thermal radiation reaching the tank. In this way the evaporation rate inside the tank 1 is substantially reduced.

In this connection it is particularly advantageous that evaporating hydrogen need no longer be released into the atmosphere but may be profitably utilized in the fuel cell. In this way it is possible to bridge even long pauses in operation with the release of hydrogen, it being possible in addition to use excess electrical energy for recharging the battery 27.

Assuming an efficiency of 50% for the fuel cell, 134 W of electrical power may be obtained from a quantity of hydrogen gas which corresponds to a heat leakage rate of 1 W. This power is sufficient to drive the cooling unit 23 and at the same time to recharge the battery 27.

Furthermore, a considerably better efficiency is obtained for recharging the battery than in the case of the conventional use of a dynamo driven by the engine. If an efficiency $\eta_e$ of 0.1 is assumed for the engine, an efficiency $\eta_d$ of approximately 0.6 for the dynamo, and a charging/discharging efficiency $\eta_b$ of approximately 0.7 for the battery, in the case of a conventional arrangement, a total efficiency $$\eta = \eta_e \cdot \eta_d \cdot \eta_b \approx 0.4$$

is obtained. In contrast to this, with an efficiency $\eta_c$ of approximately 0.5 for the fuel cell, a total efficiency $$\eta = \eta_c \cdot \eta_b \approx 0.35$$

is obtained. Altogether therefore an improvement in efficiency in the order of magnitude of 10 is obtained.

A further improvement in efficiency is produced when the fuel cell is not run under full load, since then the current density at the electrodes is reduced.

If it is assumed that the heat leakage of the tank is less than 0.5 W, in the case of a conventional 100 liter tank, there will be an evaporation rate of 1.5% per day and a storage time of approximately 60 days. With the arrangement described above the heat leakage in a 100 liter tank can be reduced to 50 mW, so that a storage time of over one year is obtained.

I claim:

1. A method of increasing the storage time of a liquid hydrogen tank, comprising the steps of feeding hydrogen evaporating in the tank to a hydrogen fuel cell, generating electrical energy by means of the fuel cell, utilizing electrical energy generated by the fuel cell to drive a cooling unit, and cooling the tank by means of the cooling unit.

2. A method as claimed in claim 1, in which the steps of cooling the tank comprises cooling a radiation shield surrounding the tank by means of the cooling unit.

3. A method as claimed in claim 1 or 2, further comprising utilizing electrical energy generated by the fuel cell to charge a battery of a motor vehicle fuelled by liquid hydrogen.

4. Apparatus for storing liquid hydrogen, comprising a liquid hydrogen tank, an outlet line for removing evaporated hydrogen from the tank, a hydrogen fuel cell having a hydrogen gas intake communicating with the outlet line, an electrically powered cooling unit arranged to cool the tank, and means for transmitting electrical energy from the fuel cell to the cooling unit.

5. Apparatus as claimed in claim 4, further comprising a radiation shield surrounding the tank and being in thermal contact with the cooling unit so as to be cooled by it, thereby cooling the tank.

6. Apparatus as claimed in claim 5, further comprising a vacuum insulation casing surrounding the radiation shield.

7. Apparatus as claimed in claim 4, in which the cooling unit comprises a thermoelectric cooling element.

8. Apparatus as claimed in claim 4, in which the cooling unit comprises a linear-oscillating Stirling cooler.

9. Apparatus as claimed in claim 4, further comprising a battery and means for transmitting electrical energy from the fuel cell to the battery to charge the battery.

* * * * *